Oct. 21, 1952  B. F. SHEPHERD  2,614,813
ROCK DRILLING TOOL
Filed July 8, 1949

INVENTOR
BENJAMIN F. SHEPHERD
BY
HIS ATTORNEY.

Patented Oct. 21, 1952

2,614,813

UNITED STATES PATENT OFFICE 2,614,813

ROCK DRILLING TOOL

Benjamin F. Shepherd, Phillipsburg, N. J., assignor to Ingersoll-Rand Company, New York, N. Y., a corporation of New Jersey Application July 8, 1949, Serial No. 103,604

2 Claims. (Cl. 255—64)

This invention relates to rock drilling tools of the type in which the cutting edge is formed on a piece of hard metal which is inserted into the body and secured thereto by a metallic bonding connection.

One cause of failure of drilling tools of this type, more particularly those having inserted cutters constructed of tungsten carbide, is that the inserts tend to flake-off in the area of the reaction products of the cutter and bonding materials. It has, moreover, been found that, owing to the differential contraction of the body of the tool and the insert upon cooling, the latter is subjected to strains that may cause portions of the cutter bonded to the uniting metal to break out and seriously weaken the connection.

It is accordingly an object of the present invention to improve the construction of rock drilling tools in order to make them more durable and efficient.

A more specific object is to prevent the insert from falling out of the body of the drilling tool in the event that the junction area between the insert and the bonding connection becomes weakened unduly.

Other objects will be in part obvious and in part pointed out hereinafter.

Figure 1:
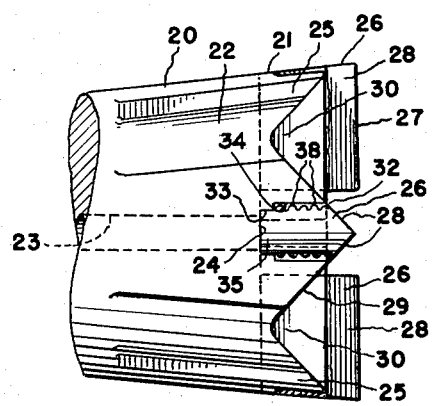
Figure 2:
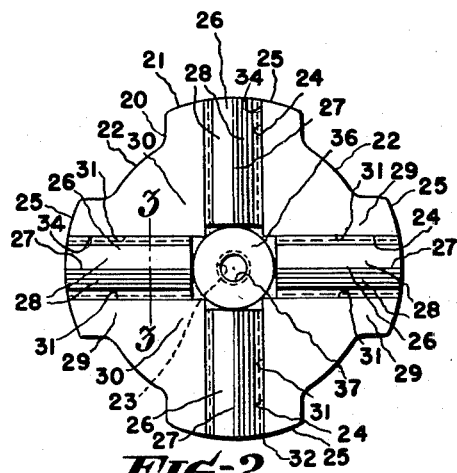
Figure 3:
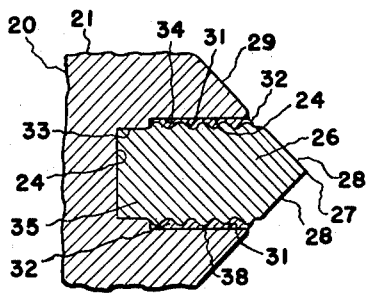
Figure 4:
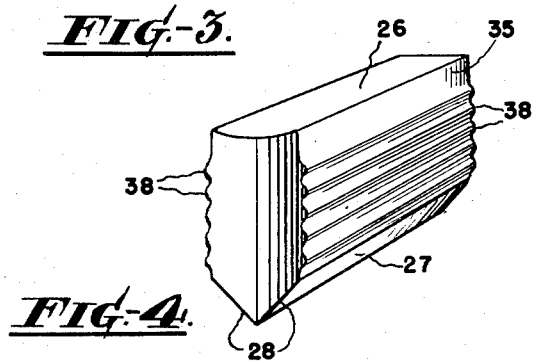

In the drawings accompanying this specification and in which similar reference numerals refer to similar parts, Figure 1 is a longitudinal side view of a rock drilling tool constructed in accordance with the practice of the invention, Figure 2 is an end view of a drilling tool, Figure 3 is a transverse view taken through Figure 2 on the line 3—3, and Figure 4 is a perspective view of a detail.

Referring more particularly to the drawings, 20 designates the body of a drilling tool of frustoconical shape and which may be an integral portion of a drill rod or a separate member adapted for attachment to a drill rod.

The large end of the body is shown having four equi-angularly spaced wings 21 separated by depressions 22 that extend longitudinally of the body for the passage of rock cuttings. A passageway 23 in the body conveys cleansing fluid to the working surface, and in the large end of the body are radial slots 24 that extend from the passage 23 to the peripheral surfaces 25 of the wings 21 to accommodate cutters 26, the outermost ends of which lie flush with the surfaces 25 of the wings.

The cutters 26 are constructed of hard metal, as for instance tungsten carbide, and having cutting edges 27 extending across their forward portions defined by inclined surfaces 28 that coincide with similar surfaces 29 extending along the sides of the slots 24 to form depressions 30 in the large end of the body 20 for the passage of cuttings from the bottom of the drill hole to the depressions 22.

Each cutter 26 is secured to the opposed surfaces 31 of a slot 24 by brazed joints 32 and, in order that all of the brazed joints may be of substantially the same thickness, the inner portion 33 of the slot 24 is narrow, as compared with the outer portion 34. Both portions 33 and 34 of the slot are of uniform width throughout their depths and the opposed side surfaces of the inner portion cooperate with the rear end 35 of the cutter 26 to centralize the cutter within the slot. The end 35 has a sliding fit in the portion 33 of the slot and thus, as will be readily appreciated, the cutter will be located within the slot such wise that the brazed joints 32 on the opposite sides thereof will be of the same thickness and both joints will, therefore, possess the desirable qualities of ductility and resistance to fatigue necessary to withstand the severe shocks to which they will be subjected in drilling.

These brazed joints, as will be observed, are also extended along the inner end surfaces of the cutters to secure thereto a member 36 seated at the intersection point of the slots 24 to serve as an abutment for the cutters 26. The member 36 is also secured to the body 20 by the brazed joint 32 and has an aperture 37 to form an outlet for the passage 23.

Means are provided for preventing a cutter 26 from falling out of the body 20 in the event of failure of the brazed joint. To this end the sides of the cutter confronting the surfaces 31 are provided with protuberances 38 that extend laterally into the brazed joints 32 to interlock therewith. In a preferred form, the protuberances 38 consist of corregations or ribs that extend along the sides of the cutter in parallelism with the cutting edge 27 and the distance across the cutter from crest to crest of the corrugations is less than the width of the portion 34 of the slot. Owing to this arrangement, the brazing material between the crest of the corrugations and the surfaces 31 will be sufficiently deep to assure the ductility necessary to withstand the strains and shocks of drilling.

In practice, it has been found that by thus embedding portions of the insert in the brazing material 32 the cutter 26 will at all times be retained in its correct assembled position even though portions of the junction area have become impaired and that a faulty or loosened cutter may, therefore, be withdrawn from the drill hole instead of remaining there to interfere with the progress of drilling.

I claim:

1. A rock drilling tool, comprising a body having a radial slot in an end thereof, a hard metal insert in the slot having a cutting edge extending across its forward portion, a metallic bonding connection for securing the insert to the surfaces of the slot, and protuberances on the insert lying in parallelism with the cutting edge and embedded in the bonding connection and being spaced from the adjacent surfaces of the slot.

2. A rock drilling tool, comprising a body having a radial slot in an end thereof, said slot having two portions of different widths and each portion being defined by opposed surfaces arranged in parallelism with each other throughout the depth of such portion, a hard metal insert in the slot cooperating slidably with the portion of smaller width for centralizing the insert in the slot and having a cutting edge extending across its forward portion, a metallic bonding connection for securing the insert to the surfaces of the slot, and protuberances on the insert lying in parallelism with the cutting edge and within the larger portion of the slot in spaced relation with the surfaces thereof and embedded in the bonding connection for preventing withdrawal of the insert from the slot.

BENJAMIN F. SHEPHERD.

REFERENCES CITED

The following references are of record in the file of this patent:

UNITED STATES PATENTS

| Number | Name | Date |
|---|---|---|
| 2,018,073 | Laise | Oct. 22, 1935 |
| 2,022,194 | Galvin | Nov. 26, 1935 |
| 2,101,376 | Voigtlander | Dec. 7, 1937 |
| 2,101,864 | McCallum | Dec. 14, 1937 |
| 2,252,745 | Williams | Aug. 19, 1941 |
| 2,502,128 | Curtis | Mar. 8, 1950 |